United States Patent
Ayzenberg et al.

(10) Patent No.: US 10,055,032 B2
(45) Date of Patent: Aug. 21, 2018

(54) ACTIVE PEN SIGNAL DETECTION

(71) Applicant: Synaptics Incorporated, San Jose, CA (US)

(72) Inventors: Oscar Ayzenberg, Cupertino, CA (US); Felix Schmitt, Oakland, CA (US)

(73) Assignee: Synaptics Incorporated, San Jose, CA (US)

( * ) Notice: Subject to any disclaimer, the term of this patent is extended or adjusted under 35 U.S.C. 154(b) by 51 days.

(21) Appl. No.: 15/087,912

(22) Filed: Mar. 31, 2016

(65) Prior Publication Data
US 2017/0285773 A1    Oct. 5, 2017

(51) Int. Cl.
*G06F 3/0354*    (2013.01)
*G06F 3/044*    (2006.01)

(52) U.S. Cl.
CPC .......... *G06F 3/03545* (2013.01); *G06F 3/044* (2013.01)

(58) Field of Classification Search
CPC ........... G06F 3/03545; G06F 3/038; G06F 2203/04106; G06F 3/0383; G06F 3/044; G06F 3/0416
See application file for complete search history.

(56) References Cited

U.S. PATENT DOCUMENTS

| | | | |
|---|---|---|---|
| 8,970,506 B2* | 3/2015 | Krah | G06F 1/3215 345/173 |
| 9,201,548 B2* | 12/2015 | Leek | G06F 3/046 |
| 9,483,142 B2* | 11/2016 | King-Smith | |
| 2010/0085325 A1* | 4/2010 | King-Smith | G06F 3/03545 345/174 |
| 2013/0033442 A1* | 2/2013 | Chu | G06F 3/044 345/173 |
| 2014/0184554 A1* | 7/2014 | Walley | G06F 3/0416 345/174 |
| 2015/0029136 A1* | 1/2015 | Shahparnia | G06F 3/044 345/174 |
| 2016/0188085 A1* | 6/2016 | Leigh | G06F 3/0416 345/174 |

* cited by examiner

*Primary Examiner* — Jennifer Mehmood
*Assistant Examiner* — Sardis F Azongha
(74) *Attorney, Agent, or Firm* — Ferguson Braswell Fraser Kubasta PC

(57) ABSTRACT

In a method of active pen signal detection, a signal is received from an active pen, wherein the active pen is configured for use with a capacitive sensing input device. At least one of downconverting and aliasing is performed on the signal to achieve a resulting signal. Presence of one of a plurality of possible resulting signal frequencies present in the resulting signal is detected. The detected resulting signal frequency is associated with a particular one of a plurality of possible transmission frequencies of the signal, and each of the plurality of transmission frequencies of the signal represents information about operation of the active pen.

14 Claims, 7 Drawing Sheets

800

RECEIVING A SIGNAL FROM AN ACTIVE PEN, WHEREIN THE ACTIVE PEN IS CONFIGURED FOR USE WITH A CAPACITIVE SENSING INPUT DEVICE
810

PERFORMING AT LEAST ONE OF DOWNCONVERTING AND ALIASING TO ACHIEVE A RESULTING SIGNAL FROM THE SIGNAL
820

DETECTING ONE OF A PLURALITY OF POSSIBLE RESULTING SIGNAL FREQUENCIES PRESENT IN THE RESULTING SIGNAL, WHEREIN THE DETECTED RESULTING SIGNAL FREQUENCY IS ASSOCIATED WITH A PARTICULAR ONE OF A PLURALITY OF POSSIBLE TRANSMISSION FREQUENCIES OF THE SIGNAL, AND WHEREIN EACH OF THE PLURALITY OF TRANSMISSION FREQUENCIES OF THE SIGNAL REPRESENTS INFORMATION ABOUT OPERATION OF THE ACTIVE PEN
830

FIG. 8

ACTIVE PEN SIGNAL DETECTION

BACKGROUND

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. An input object may be without limitation, one or more of a human digit (i.e. a finger), a stylus, and an active pen (where an active pen is similar to a stylus but is also configured to output one or more signals to indicate operation(s) of the active pen). Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones and tablet computers). Such touch screen input devices are typically superimposed upon or otherwise collocated with a display of the electronic system.

SUMMARY

In a method of active pen detection, a signal is received from an active pen, wherein the active pen is configured for use with a capacitive sensing input device. At least one of downconverting and aliasing is performed on the signal to achieve a resulting signal. Presence of one of a plurality of possible resulting signal frequencies present in the resulting signal is detected. The detected resulting signal frequency is associated with a particular one of a plurality of possible transmission frequencies of the signal, and each of the plurality of transmission frequencies of the signal represents information about operation of the active pen. This method of operation can be implemented in a processing system for a capacitive sensing input device or in other methods of signal processing.

BRIEF DESCRIPTION OF DRAWINGS

The drawings referred to in this Brief Description of Drawings should not be understood as being drawn to scale unless specifically noted. The accompanying drawings, which are incorporated in and form a part of the Description of Embodiments, illustrate various embodiments and, together with the Description of Embodiments, serve to explain principles discussed below, where like designations denote like elements, and:

FIG. 8 illustrates a flow diagram of an example method of active pen signal detection, according to various embodiments.

DESCRIPTION OF EMBODIMENTS

The following Description of Embodiments is merely provided by way of example and not of limitation. Furthermore, there is no intention to be bound by any expressed or implied theory presented in the preceding Background, Summary, or Brief Description of Drawings or the following Description of Embodiments.

Overview of Discussion

Herein, various embodiments are described that provide input devices, processing systems, and methods that facilitate improved usability. In various embodiments described herein, the input device may be a capacitive sensing input device. Utilizing techniques described herein, efficiencies may be achieved by using an existing processing system for a capacitive sensing input device to detect the presence and frequency of one or more signals from an active pen, when otherwise one or more of the active pen signals might be undetectable due to being outside of the operating range of one or more of the components of the processing system. It should be appreciated that during a different time period the components of the processing system can be operated in a different manner to process capacitive resulting signals from the capacitive sensing input device instead of detecting for active pen signals. Conventionally, the processing system would have to be redesigned to provide for increased sampling bandwidth if an active pen signal was above its sampling range, or a separate detection circuit would have to be designed and used. The non-intuitive techniques described herein allow an existing processing system to be adapted, such as via firmware update, to work with different active pens that may transmit active pen signals at a variety of frequencies some of which, conventionally, would be considered above its operating range. This prevents costly redesign or use of a separate circuit, it also saves power by operating at lower sampling rates while precluding the need to design and manufacture a new processing system Application Specific Integrated Circuit (ASIC) or specialized active pen signal detection circuit.

Discussion begins with a description of an example input device with which or upon which various embodiments described herein may be implemented. An example sensor electrode pattern is then described. This is followed by description of an example processing system and some components thereof, to include description of the use of the processing system for capacitive sensing and additional use of the processing system for active pen signal detection. The processing system may be utilized with or as a portion of an input device, such as a capacitive sensing input device. Discussion of active pen signal frequency reduction techniques is then provided. Operation of the input device, processing systems, and components thereof are then further described in conjunction with description of an example method of active pen signal detection.

Example Input Device

Figure 1:
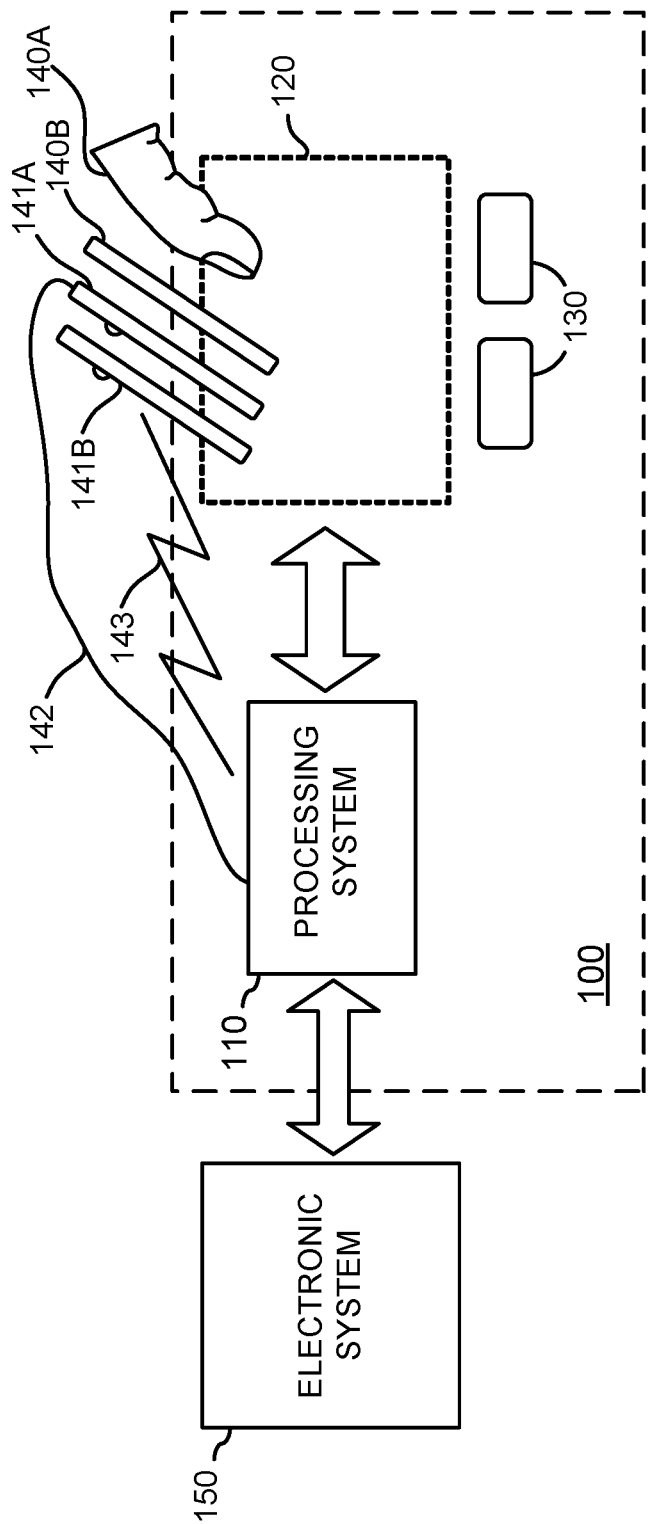
FIG. 1 is a block diagram of an example input device, in accordance with embodiments.

Turning now to the figures, FIG. 1 is a block diagram of an example input device 100, in accordance with various embodiments. Input device 100 may be configured to provide input to an electronic system/device 150. As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic systems could be a host or a slave to the input device.

Input device 100 can be implemented as a physical part of an electronic system 150, or can be physically separate from electronic system 150. As appropriate, input device 100 may communicate with parts of the electronic system using any one or more of the following: buses, networks, and other wired or wireless interconnections. Examples include, but are not limited to: Inter-Integrated Circuit (I2C), Serial Peripheral Interface (SPI), Personal System 2 (PS/2), Universal Serial Bus (USB), Bluetooth®, Radio Frequency (RF), and Infrared Data Association (IrDA).

In FIG. 1, input device 100 is shown as a proximity sensor device (also often referred to as a "touchpad" or a "touch sensor device") configured to sense input provided by one or more input objects 140, 141 in a sensing region 120. Example passive input objects include fingers and styli 140A and 140B, as shown in FIG. 1. Example active input objects include active pens 141A and 141B. Active pen 141A is wired and transmits its active pen signals over a wireline 142 for receipt by a processing system 110. Active pen 141B is wireless and transmits its active pen signals via a radio frequency signal 143 for receipt by a processing system 110. In some embodiments, the active pen 141B may wirelessly transmit active pen signals by driving capacitive signals on one or more electrodes disposed on the active pen 141B.

Sensing region 120 encompasses any space above, around, in and/or near input device 100, in which input device 100 is able to detect user input (e.g., user input provided by one or more input objects 140, 141). The sizes, shapes, and locations of particular sensing regions may vary widely from embodiment to embodiment. In some embodiments, sensing region 120 extends from a surface of input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of input device 100, contact with an input surface (e.g., a touch surface) of input device 100, contact with an input surface of input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, sensing region 120 has a rectangular shape when projected onto an input surface of input device 100.

Input device 100 may utilize any combination of sensor components and sensing technologies to detect user input in the sensing region 120. Input device 100 comprises one or more sensing elements for detecting user input. Input device 100 may use capacitive sensing techniques.

Some implementations are configured to provide images that span one, two, three, or higher dimensional spaces. Some implementations are configured to provide projections of input along particular axes or planes.

In some capacitive sensing implementations of input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Collectively transmitters and receivers may be referred to as sensor electrodes or sensor elements. Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g., other electromagnetic signals). Sensor electrodes may be dedicated transmitters or receivers, or may be configured to both transmit and receive.

In some embodiments, one or more receiver electrodes may be operated to receive a resulting signal when no transmitter electrodes are transmitting (e.g., the transmitters are disabled). In this manner, the resulting signal represents noise detected in the operating environment of sensing region 120. In this manner, in some embodiments, the resulting signal represents noise detected in the operating environment of sensing region 120. For example, display noise of a nearby or co-located (e.g., overlapping) display may be represented in the resulting signal that is received during transcapacitive sensing.

In FIG. 1, a processing system 110 is shown as part of input device 100. Processing system 110 is configured to operate the hardware of input device 100 to detect input in sensing region 120. Processing system 110 comprises parts of or all of one or more integrated circuits (ICs) and/or other circuitry components. (For example, a processing system for a mutual capacitance (i.e., transcapacitive) sensor device may comprise transmitter circuitry configured to transmit signals with transmitter sensor electrodes, and/or receiver circuitry configured to receive signals with receiver sensor electrodes). In some embodiments, processing system 110 also comprises electronically-readable instructions, such as firmware code, software code, and/or the like. In some embodiments, components composing processing system 110 are located together, such as near sensing element(s) of input device 100. In other embodiments, components of processing system 110 are physically separate with one or more components close to sensing element(s) of input device 100, and one or more components elsewhere. For example, input device 100 may be a peripheral coupled to a desktop computer, and processing system 110 may comprise software configured to run on a central processing unit of the desktop computer and one or more ICs (perhaps with associated firmware) separate from the central processing unit. As another example, input device 100 may be physically integrated in a phone, and processing system 110 may comprise circuits and firmware that are part of a main processor of the phone. In some embodiments, processing system 110 is dedicated to implementing input device 100. In other embodiments, processing system 110 also performs other functions, such as operating display screens, driving haptic actuators, etc.

Processing system 110 may be implemented as a set of modules that handle different functions of processing system 110. Each module may comprise circuitry that is a part of processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor modules configured to operate sensing element(s) or other structures to detect input and determination modules configured to determine positions of any inputs objects detected. For example, a sensor module may perform one or more of absolute capacitive sensing and transcapacitive sensing to detect inputs, and a determination module may determine positions of inputs based on the detected capacitances or changes thereto. In some embodiments, other modules or functionality may be included in processing system 110; for example, an identification module may be included and configured to identify gestures from detected inputs.

In some embodiments, processing system 110 responds to user input (or lack of user input) in sensing region 120 directly by causing one or more actions. Example actions include changing operation modes, as well as Graphic User Interface (GUI) actions such as cursor movement, selection, menu navigation, and other functions. In some embodiments, processing system 110 provides information about the input (or lack of input) to some part of the electronic system (e.g., to a central processing system of the electronic system that is separate from processing system 110, if such a separate central processing system exists). In some embodiments, some part of the electronic system processes information received from processing system 110 to act on user input, such as to facilitate a full range of actions, including mode changing actions and GUI actions.

For example, in some embodiments, processing system 110 operates the sensing element(s) of input device 100 to produce electrical signals indicative of input (or lack of input) in sensing region 120. Processing system 110 may perform any appropriate amount of processing on the electrical signals in producing the information provided to the electronic system. For example, processing system 110 may digitize analog electrical signals obtained from the sensor electrodes. As another example, processing system 110 may perform filtering or other signal conditioning. As yet another example, processing system 110 may subtract or otherwise account for a baseline, such that the information reflects a difference between the electrical signals and the baseline. As yet further examples, processing system 110 may determine positional information, recognize inputs as commands, recognize handwriting, and the like.

"Positional information" as used herein broadly encompasses absolute position, relative position, velocity, acceleration, and other types of spatial information. As one example, "zero-dimensional" positional information includes near/far or contact/no contact information. As another example, "one-dimensional" positional information includes positions along an axis. As yet another example, "two-dimensional" positional information includes motions in a plane. As still another example, "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, input device 100 is implemented with additional input components that are operated by processing system 110 or by some other processing system. These additional input components may provide redundant functionality for input in sensing region 120, or some other functionality. FIG. 1 shows buttons 130 near sensing region 120 that can be used to facilitate selection of items using input device 100. Other types of additional input components include sliders, balls, wheels, switches, and the like. Conversely, in some embodiments, input device 100 may be implemented with no other input components.

In some embodiments, input device 100 may be a touch screen, and sensing region 120 overlaps at least part of an active area of a display screen. For example, input device 100 may comprise substantially transparent sensor electrodes overlaying the display screen and provide a touch screen interface for the associated electronic system 150. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. Input device 100 and the display screen may share physical elements. For example, some embodiments may utilize some of the same electrical components for displaying and sensing. As another example, the display screen may be operated in part or in total by processing system 110.

It should be understood that while many embodiments are described in the context of a fully functioning apparatus, the mechanisms are capable of being distributed as a program product (e.g., software) in a variety of forms. For example, the mechanisms that are described may be implemented and distributed as a software program on information bearing media that are readable by electronic processors (e.g., non-transitory computer-readable and/or recordable/writable information bearing media readable by processing system 110). Additionally, the embodiments apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other non-transitory storage technology.

Example Sensor Electrode Pattern

Figure 2:
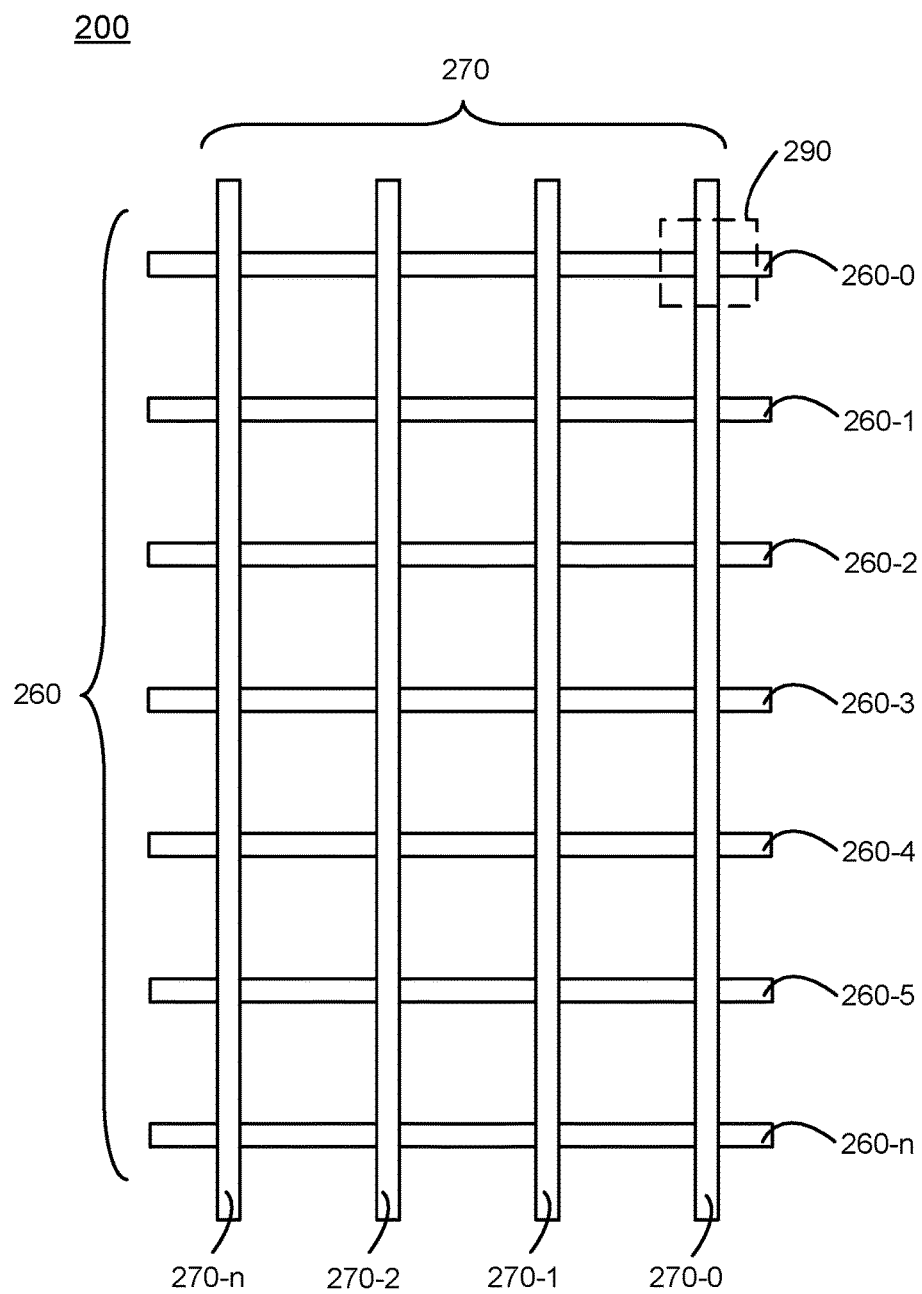
FIG. 2 shows a portion of an example sensor electrode pattern which may be utilized in a sensor to generate all or part of the sensing region of an input device, such as a touch screen, according to some embodiments.

FIG. 2 shows a portion of an example sensor electrode pattern 200 which may be utilized in a sensor to generate all or part of the sensing region of input device 100, according to various embodiments. Input device 100 is configured as a capacitive sensing input device when utilized with a capacitive sensor electrode pattern. For purposes of clarity of illustration and description, a non-limiting simple rectangular sensor electrode pattern 200 is illustrated. It is appreciated that numerous other sensor electrode patterns may be employed with the techniques described herein, including but not limited to: patterns with a single sensor electrode; patterns with a single set of sensor electrodes; patterns with two sets of sensor electrodes disposed in a single layer (without overlapping); patterns with two sets of sensor electrodes disposed in a single layer employing jumpers at crossover regions between sensor electrodes; patterns that utilize one or more display electrodes of a display device such as one or more segments of a common voltage ($V_{COM}$) electrode; patterns with one or more of source electrodes, gate electrodes, anode electrodes, and cathode electrodes; and patterns that provide individual button electrodes.

The illustrated sensor electrode pattern is made up of a first plurality of sensor electrodes 270 (270-0, 270-1, 270-2 . . . 270-n) and a second plurality of sensor electrodes 260 (260-0, 260-1, 260-2 . . . 260-n) which overlay one another, in this example. In many embodiments, processing system 110 is configured to operate the second plurality of sensor electrodes 260 as transmitter electrodes by driving them with transmitter signals and the first plurality of sensor electrodes 270 as receiver electrodes by receiving resulting signals with them. Other embodiments, may reverse the roles of sensor electrodes 260 and 270. In the illustrated example, sensing pixels are centered at locations where transmitter and receiver electrodes cross. Capacitive pixel 290 illustrates one of the capacitive pixels generated by sensor electrode pattern 200 during transcapacitive sensing. It is appreciated that in a crossing sensor electrode pattern, such as the illustrated example, some form of insulating material or substrate is typically disposed between transmitter electrodes 260 and receiver electrodes 270. However, in some embodiments, transmitter electrodes 260 and receiver electrodes 270 may be disposed on the same layer as one another through use of routing techniques and/or jumpers. In various embodiments, touch sensing includes sensing input objects anywhere in sensing region 120 and may comprise: no contact with any surfaces of the input device 100, contact with an input surface (e.g., a touch surface) of the input device 100, contact with an input surface of the input device 100 coupled with some amount of applied force or pressure, and/or a combination thereof.

When accomplishing transcapacitive measurements, capacitive pixels, such as capacitive pixel 290, are areas of localized capacitive coupling between transmitter electrodes 260 and receiver electrodes 270. The capacitive coupling between transmitter electrodes 260 and receiver electrodes 270 changes with the proximity and motion of input objects in the sensing region associated with transmitter electrodes 260 and receiver electrodes 270.

In some embodiments, sensor electrode pattern 200 is "scanned" to determine these capacitive couplings. That is, the transmitter electrodes 260 are driven to transmit transmitter signals. Transmitters may be operated such that one transmitter electrode transmits at one time, or multiple transmitter electrodes transmit at the same time. Where multiple transmitter electrodes transmit simultaneously, these multiple transmitter electrodes may transmit the same transmitter signal and produce an effectively larger transmitter electrode, or these multiple transmitter electrodes may transmit different transmitter signals. For example, multiple transmitter electrodes may transmit different transmitter signals according to one or more coding schemes that enable their combined effects on the resulting signals of receiver electrodes 270 to be independently determined.

The receiver electrodes 270 may be operated singly or multiply to acquire resulting signals. The resulting signals may be used to determine measurements of the capacitive couplings at the capacitive pixels where transmitter electrodes 260 and receiver electrodes 270 cross or interact to measure a transcapacitance.

A set of measurements from the capacitive pixels form a "capacitive image" (also "capacitive frame") representative of the capacitive couplings at the pixels. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

In some embodiments, one or more sensor electrodes 260 or 270 may be operated to perform absolute capacitive sensing at a particular instance of time. For example, sensor electrode 270-0 may be charged and then the capacitance of sensor electrode 270-0 may be measured. In such an embodiment, an input object 140, 141 interacting with sensor electrode 270-0 alters the electric field near sensor electrode 270-0, thus changing the measured capacitive coupling. In this same manner, a plurality of sensor electrodes 270 may be used to measure absolute capacitance and/or a plurality of sensor electrodes 260 may be used to measure absolute capacitance. It should be appreciated that when performing absolute capacitance measurements the labels of "receiver electrode" and "transmitter electrode" lose the significance that they have in transcapacitive measurement techniques, and instead a sensor electrode 260 or 270 may simply be referred to as a "sensor electrode" or may continue to use its designation as a transmitter electrode or a receiver electrode even though they are used in the same manner during absolute capacitive sensing.

Background capacitance is the capacitive image of a sensor pattern or the absolute capacitance measured on a sensor electrode with no input object in the sensing region of a sensor electrode pattern. The background capacitance changes with the environment and operating conditions.

Capacitive images and absolute capacitance measurements can be adjusted for the background capacitance of the sensor device for more efficient processing. For example, various techniques may be employed internal and/or external to an ASIC/processing system to subtract/offset some amount of the baseline capacitance that is known to be present in an absolute capacitive measurement. In absolute capacitive sensing, such charge offsetting improves the dynamic range of an amplifier of the ASIC/processing system that is used to amplify a signal which includes an input object related component on top of the baseline absolute capacitance signal measurement. This is because the component of the signal attributed to presence of an input object can be more greatly amplified (without amplifier saturation) if some of the baseline portion is removed by internal offsetting.

Many techniques for internal offset (internal to the ASIC/processing system) of a baseline charge are known in the art and include utilizing an offsetting capacitance in parallel with a feedback capacitor of the amplifier and/or injecting charge to an input of the amplifier that is also coupled with the sensor from which an absolute capacitance is being measured.

In some embodiments, using techniques herein, one or more portions of a printed circuit (e.g., a flexible printed circuit, a printed circuit board, a lithographically printed circuit, or other type of printed circuit) that includes routing traces used to couple sensing signals to and/or from sensors in a sensing region of a sensing device can be used to offset some amount of the baseline capacitance measured during absolute capacitive sensing. This type of charge offsetting is accomplished external to the ASIC/processing system. It should be appreciated that any of the external charge offsetting techniques described herein may be utilized alone or may be used in combination with one or more internal charge offsetting techniques.

Example Processing System

Figure 3:
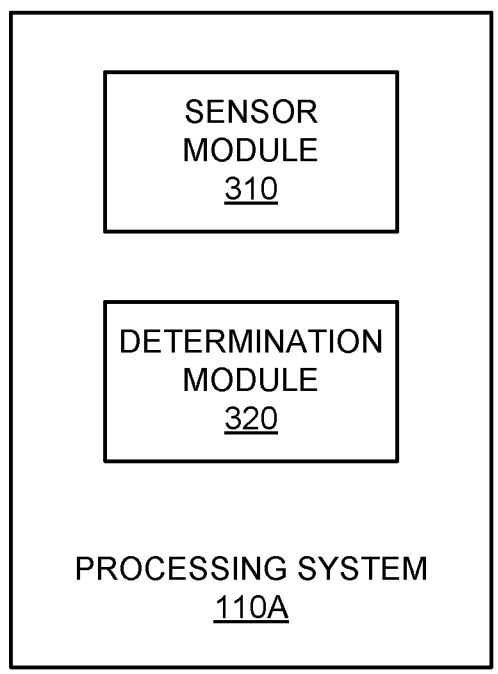
FIG. 3 illustrates a block diagram of some components of an example processing system that may be utilized with an input device, according to various embodiments.

FIG. 3 illustrates a block diagram of some components of an example processing system 110A that may be utilized with an input device (e.g., in place of processing system 110 as part of input device 100), according to various embodiments. As described herein, input device 100 is a capacitive sensing input device. Additionally, as described herein, processing system 110A may also be configured for use with an active pen 141 (e.g., 141A, 141B of FIG. 1) to detect the occurrence and frequency (in Hertz) of active pen signal(s) transmitted from the active pen 141. Processing system 110A may be implemented with one or more Application Specific Integrated Circuits (ASICSs), one or more Integrated Circuits (ICs), one or more controllers, or some combination thereof. In one embodiment, processing system 110A is communicatively coupled with one or more transmitter electrode(s) and receiver electrode(s) that implement a sensing region 120 of an input device 100. In some embodiments, processing system 110A and the input device 100 of which it is a part may be disposed in or communicatively coupled with an electronic system 150, such as a display device, computer, or other electronic system.

In one embodiment, processing system 110A includes, among other components: sensor module 310, and determination module 320. Processing system 110A and/or components thereof may be coupled with sensor electrodes of a sensor electrode pattern, such as sensor electrode pattern 200, among others. For example, sensor module 310 is coupled with one or more sensor electrodes (260, 270) of a sensor electrode pattern (e.g., sensor electrode pattern 200) of input device 100.

In various embodiments, sensor module 310 comprises sensor circuitry and operates to interact with the sensor electrodes, of a sensor electrode pattern, that are utilized to generate a sensing region 120. This includes operating a first plurality of sensor electrodes (e.g., sensor electrodes 260) to be silent, to be driven with a transmitter signal, to be used for transcapacitive sensing, and/or to be used for absolute capacitive sensing. This also includes operating a second plurality of sensor electrodes (e.g., sensor electrodes 270) to be silent, to be driven with a transmitter signal, to be used for transcapacitive sensing, and/or to be used for absolute capacitive sensing.

Sensor module 310 is configured to acquire transcapacitive resulting signals by transmitting with a first one of a plurality of sensor electrodes of the input device and receiving with a second one of the plurality of sensor electrodes. During transcapacitive sensing, sensor module 310 operates to drive (i.e., transmit) transmitter signals on one or more sensor electrodes of a first plurality of sensor electrodes (e.g., one or more of transmitter electrodes 260). A transmitter signal may be a square wave, trapezoidal wave, or some other waveform. In a given time interval, sensor module 310 may drive or not drive a transmitter signal (waveform) on one or more of the plurality of sensor electrodes. Sensor module 310 may also be utilized to couple one or more of the first plurality of sensor electrodes to high impedance, ground, or to a constant voltage when not driving a transmitter signal on such sensor electrodes. In some embodiments, when performing transcapacitive sensing, sensor module 310 drives two or more transmitter electrodes of a sensor electrode pattern at one time. When driving two or more sensor electrodes of a sensor electrode pattern at once, the transmitter signals may be coded according to a code. The code may be altered, such as lengthening or shortening the code. Sensor module 310 also operates to receive resulting signals, via a second plurality of sensor electrodes (e.g., one or more of receiver electrodes 270) during transcapacitive sensing. During transcapacitive sensing, received resulting signals correspond to and include effects corresponding to the transmitter signal(s) transmitted via the first plurality of sensor electrodes. These transmitted transmitter signals may be altered or changed in the resulting signal due to presence of an input object, stray capacitance, noise, interference, and/or circuit imperfections among other factors, and thus may differ slightly or greatly from their transmitted versions. It is appreciated that sensor module 310 may, in a similar fashion, transmit transmitter signals on one or more of sensor electrodes 270 and receive corresponding resulting signals on one or more of sensor electrodes 260.

In absolute capacitive sensing, a sensor electrode is both driven and used to receive a resulting signal that results from the signal driven on to the sensor electrode. In this manner, during absolute capacitive sensing, sensor module 310 operates to drive (i.e., transmit) a signal on to and receive a signal from one or more of sensor electrodes 260 or 270. During absolute capacitive sensing, the driven signal may be referred to as an absolute capacitive sensing signal, transmitter signal, or modulated signal, and it is driven through a routing trace that provides a communicative coupling between processing system 110A and the sensor electrode(s) with which absolute capacitive sensing is being conducted.

In various embodiments, sensor module 310 includes one or more amplifiers. Such an amplifier may be interchangeably referred to as an "amplifier," a "front-end amplifier," a "receiver," an "integrating amplifier," a "differential amplifier," or the like, and operates to receive a resulting signal at an input and provide an integrated voltage as an output. The resulting signal is from one or more sensor electrodes of a sensor electrode pattern, such as sensor electrode pattern 200. A single amplifier may be coupled with and used to receive a resulting signal from exclusively from a single sensor electrode, may receive signals from multiple sensor electrodes that are simultaneously coupled with the amplifier, or may receive signals from a plurality of sensor electrodes that are coupled one at a time to the amplifier. A sensor module 310 may include multiple amplifiers utilized in any of these manners. For example, in some embodiments, a first amplifier may be coupled with a first sensor electrode while a second amplifier is coupled with a second sensor electrode.

Determination module 320 may be implemented as hardware (e.g., hardware logic and/or other circuitry) and/or as a combination of hardware and instructions stored in a non-transitory manner in a computer readable storage medium.

Determination module 320 operates to compute/determine a measurement of a change in a transcapacitive coupling between a first and second sensor electrode during transcapacitive sensing. Determination module 320 then uses such measurements to determine the positional information comprising the position of an input object (if any) with respect to sensing region 120. The positional information can be determined from a transcapacitive image. The transcapacitive image is determined by determination module 320 based upon resulting signals acquired by sensor module 310. The resulting signals are used as or form capacitive pixels representative of input(s) relative to sensing region 120. It is appreciated that determination module 320 operates to decode and reassemble coded resulting signals to construct a transcapacitive image from a transcapacitive scan of a plurality of sensor electrodes.

In embodiments where absolute capacitive sensing is performed with sensor electrodes 260 and/or 270, determination module 320 also operates to compute/determine a measurement of absolute capacitive coupling to a sensor electrode. For example, determination module 320 operates to determine an absolute capacitance of the sensor electrode (e.g., sensor electrode 270-0) after a sensing signal has been driven on the sensor electrode.

In some embodiments, processing system 110A comprises decision making logic which directs one or more portions of processing system 110A, such as sensor module 310 and/or determination module 320, to operate in a selected one of a plurality of different operating modes based on various inputs.

Example Operation of the Processing System During Capacitive Sensing

Figure 4A:
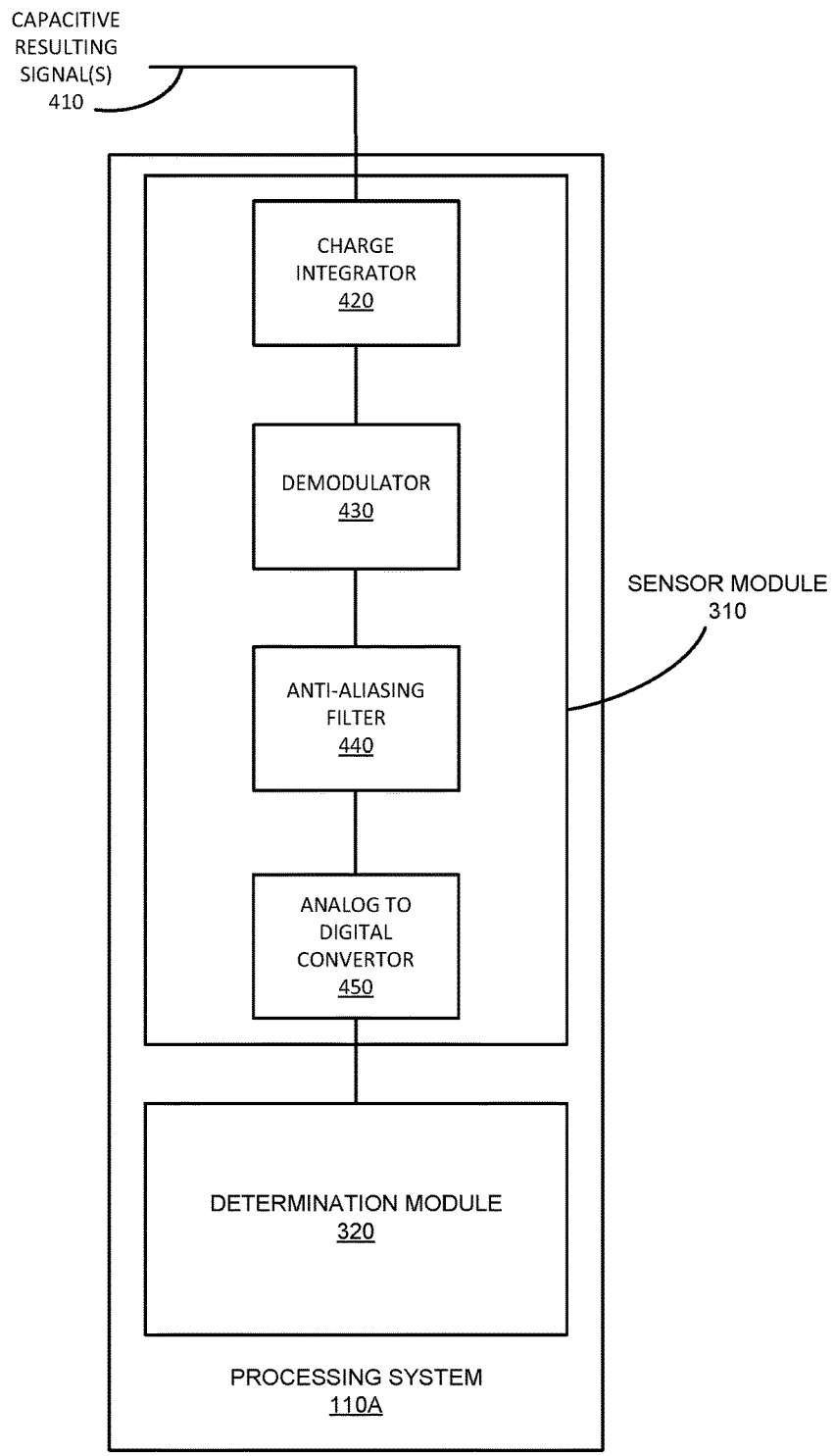
FIG. 4A illustrates a block diagram of components of a processing system configured for capacitive resulting signal processing, according to various embodiments.

FIG. 4A illustrates a block diagram of components of a processing system 110A configured for capacitive resulting signal processing, according to various embodiments. Sensor module 310 and determination module 320 are depicted. As shown, sensor module 310 includes a charge integrator 420, a demodulator 430, an anti-aliasing filter 440 and an analog-to-digital convertor 450. Collectively components 420-450 may also be referred to as an analog front end.

Charge integrator 410 operates to integrate an incoming capacitive resulting signal 410 (which may be an absolute capacitive resulting signal or transcapacitive resulting signal).

Demodulator 430 then demodulates the integrated signal. The demodulation frequency of demodulator 430 is selectable, by processing system 110A, within its operating frequency range. Demodulator 430 has a bypass mode, which can be activated by logic of processing system 110A, and which passes signals through without demodulation. The bypass mode of demodulator 430 is not typically utilized during capacitive signal processing. Demodulator 430 is configured to selectively demodulate the integrated signal to achieve a demodulated signal that is downconverted from its original frequency to a lower frequency. By selectively, what is meant is that in bypass mode (typically only used during some embodiments of active pen signal detection) no demodulation would take place.

Anti-aliasing filter 440 receives the demodulated signal and performs anti-alias filtering on it. Anti-alias filtering restricts the bandwidth of the signal that is being processed through analog-to-digital convertor 450 by filtering out signals above the Nyquist frequency of analog-to-digital convertor 450, and may also filter out signals above the frequencies of interest, which would typically be noise or other undesirable signals. Anti-aliasing filter 440 has a bypass mode, which can be activated by logic of processing system 110A, and which passes signals through without anti-alias filtering. The bypass mode of anti-aliasing filter 440 is not typically utilized during capacitive signal processing.

Analog-to-digital convertor 450 performs analog-to-digital conversion on the signal, and aliases all signals above its Nyquist frequency into aliased signals that are below its Nyquist frequency. Analog-to-digital convertor 450 outputs a digital signal to determination module 320 which then determines a capacitance associated with the received capacitive resulting signal 410. Analog-to-digital convertor 450 has a sampling rate that is selectable, by processing system 110A, within its operating frequency range. Analog-to-digital convertor 450 has a bypass mode, which can be activated by logic of processing system 110A, and which passes signals through without analog-to-digital conversion. The bypass mode of analog-to-digital convertor 450 is not typically utilized during capacitive signal processing.

Example Operation of the Processing System During Active Pen Signal Detection

Figure 4B:
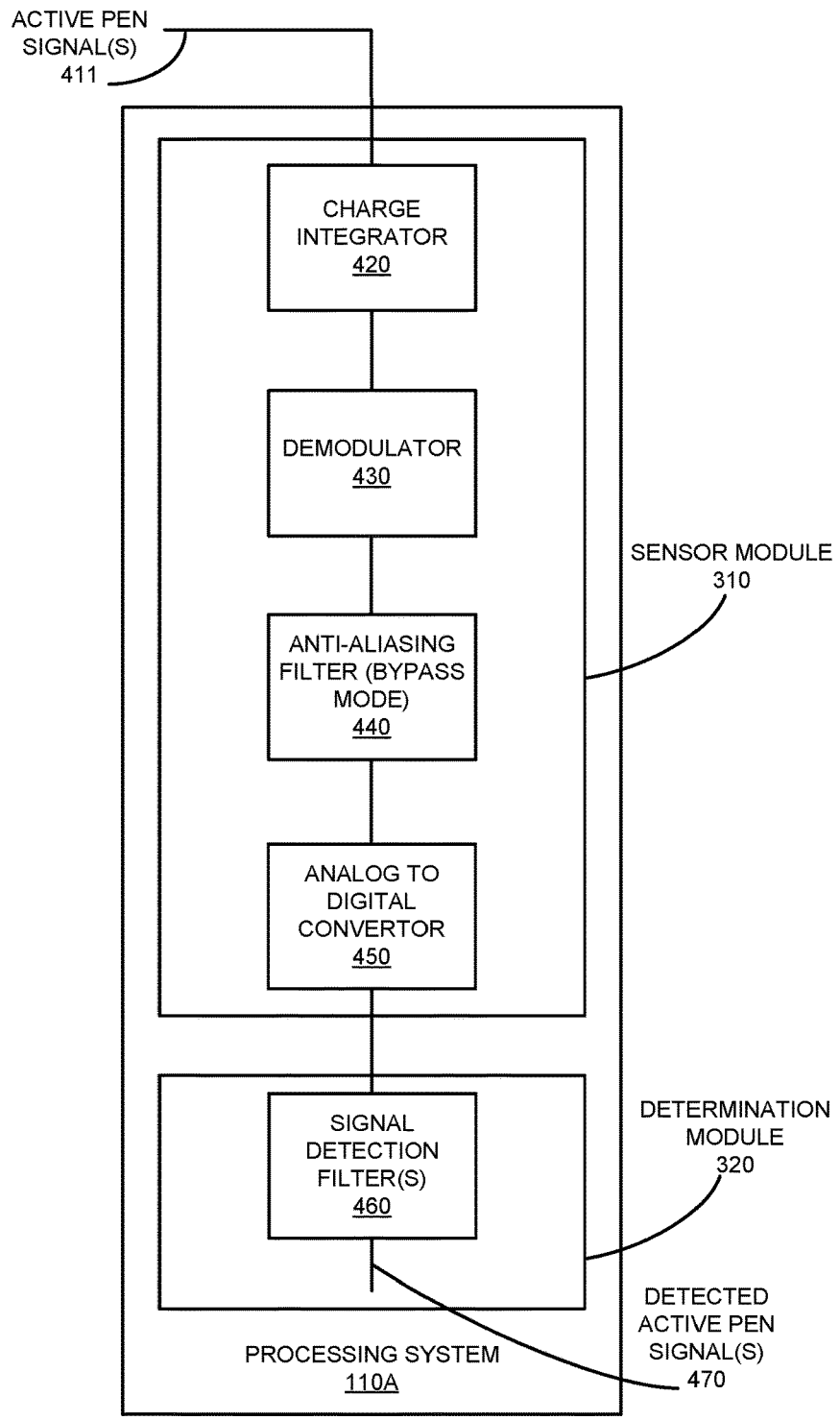
FIG. 4B illustrates a block diagram of components of a processing system configured for active pen signal detection, according to various embodiments.

FIG. 4B illustrates a block diagram of components of a processing system 110A configured for active pen signal detection, according to various embodiments. Because an active pen 141 transmits active pen signals during a certain timeslot, knowledge of this timing can be utilized to switch operation of processing system 110A from a capacitive resulting signal processing mode to an active pen signal detection mode. The components in sensor module 310 are the same as those previously described in FIG. 4A and operate in the same fashion as previously describes, except that one or more of the components is operated in a bypass mode in which signals pass through or around the component with no change caused by the component.

More specifically, during active pen detection anti-aliasing filter 440 is operated in bypass mode, in order to prevent frequencies that are above the Nyquist frequency of analog-to-digital convertor 450 from being filtered out before reaching analog-to-digital convertor 450. In some embodiments of active pen signal detection operation of processing system 110A, where one of demodulation or anti-aliasing alone sufficiently downconverts active pen signals such that they are also sufficiently spaced apart for individual detection by signal detection filters, one of demodulator 430 and analog-to-digital convertor 450 may also be operated in a bypass mode. When a component is operated in bypass mode, it passes a received signal without performing any action upon it. For example, when anti-aliasing filter 440 is operated in bypass mode by processing system 110A, it is configured to pass on to analog-to-digital convertor 450, without performing any anti-aliasing, an output of demodulator 430 that is associated with the signal from the active pen. Bypass mode of demodulator 430 allows selective demodulation of signals. Likewise, bypass mode of analog-to-digital convertor 450 allows for selective aliasing of signals.

Thus, as depicted in FIG. 4B: when a signal being sampled by analog-to-digital convertor 450 is below the Nyquist frequency of analog-to digital convertor 450 it will be received by and passed through by analog-to-digital convertor 450 without being aliased; when a signal being sampled by analog-to-digital convertor 450 is more than one times the Nyquist frequency but less than two times the Nyquist frequency, it will be aliased one time; when a signal being sampled by analog-to-digital convertor 450 is more than two times the Nyquist frequency but less than three times the Nyquist frequency, it will be aliased two times; when a signal being sampled by analog-to-digital convertor 450 is more than three times the Nyquist frequency but less than four times the Nyquist frequency, it will be aliased three times; etc. It should be understood that aliasing involves both frequency subtraction and frequency folding about the Nyquist frequency. As a general rule, an odd number of aliasings will involve frequency folding and will also involve frequency subtraction when the odd number is greater than 1, while an even number of aliasings will only result in multiple instances of frequency subtraction.

As will be further discussed below, the techniques disclosed herein take advantage of one or some combination of demodulation and aliasing to reduce the frequency and, in some instances, shape the spacing of active pen signals so that they may be more easily detected by signal detection filter(s) 460 of determination module 320.

Analog-to-digital convertor 450 samples all of the signals it receives in the same way and does not have to be programmed or provided with special instructions to perform multiple aliasing on some signals that are greater than certain integer multiples of its Nyquist frequency or to perform no aliasing on signals that are below its Nyquist frequency. This simply occurs automatically in the natural course of how an analog-to-digital convertor operates. Additionally, it should be appreciated that the above described frequency subtraction and frequency folding techniques are also accomplished automatically by the normal course of operation of an analog-to-digital convertor, and thus no special instruction is needed to direct which aliasing techniques will be performed as a received signal is processed by analog-to-digital convertor 450.

Signal detection filter(s) 460, are bandpass filters that may be implemented in software, with analog components, with digital components, or with some combination thereof. In some embodiments signal detection filter(s) 460 are disposed as a portion of determination module 320. The output of analog-to-digital convertor 450 is provided to signal detection filter(s) 460 for signal detection.

Detected active pen signal(s) 470 are the output(s) from signal detection filter(s) 460 and are associated with and correlated to the active pen signal(s) 411 that are received as inputs. Put differently, each signal detection filter 460 is a bandpass filter centered on one of a plurality of possible resulting signal frequencies that may be output from analog-to-digital convertor 450 during active pen signal detection, where the detected resulting signal frequency at a certain frequency is associated with a particular one of a plurality of possible transmission frequencies of an active pen signal.

In all cases described herein, the concern is determining what frequency upon which an active pen signal was transmitted, not decoding data modulated onto the individual active pen signal. Because of this, the sampling performed by analog-to-digital convertor 450 does not need occur rapidly enough to detect data. Put differently, each of the plurality of transmission frequencies that may be detected in an active pen signal represents information about operation of the active pen 141. In some embodiments, an active pen signal on a particular frequency, in and of itself, may be operational data about active pen 141. For example, a signal on one frequency may indicate that the active pen 141 has had a certain button pushed by a user in order to place the active pen 141 into a particular operating mode. In other cases, a signal on a particular frequency may be associated with the header of a serialized data transmission from the active pen. Following such a header, another frequency may represent a zero in the serialized data while yet another frequency represents a 1 in the serialized data. By way of example and not of limitation, such serialized data may provide operational information about the active pen 141 such as: data on location of active pen 141, data on pressure applied to the tip of active pen 141, data on handwriting recognized by active pen 141, data on optical characters recognized by the active pen 141, data on mode of operation of active pen 141 (i.e., writing mode, erasing mode, etc.), and other functionalities.

Moreover, it should be appreciated that processing system 110A is agnostic to whether it receives and processes a single active pen signal at once or simultaneously receives and processes multiple active pen signals all on different frequencies.

Selection of Demodulation Frequency and Sampling Rate for Active Pen Signal Detection Proper selection of the demodulation frequency of demodulator 430 and the sampling rate of analog-to-digital convertor 450 facilitate their combined or independent operation, as existing hardware, for signal detection of active pen signals.

Consider an example where during an active pen signal transmission time slot, an active pen 141 may transmit an active pen signal on any one or more of the following four frequencies (F1, F2, F3, and F4), where: F1 is 21.877 kHz, F2 is 25.004 kHz, F3 is 40.613 kHz, and F4 is 43.755 kHz. According to the Nyquist Theorem, direct sampling would require a Nyquist rate of approximately 88 kHz (twice the highest frequency of 43.755 kHz). Thus, a specially designed active pen signal detector or specially designed processing system would, conventionally, be designed to operate at a sampling rate of about 88 kHz. In this example, processing system 110A has a relatively low analog-todigital sampling rate, which is 20 kHz or lower. Though in some embodiments this analog-to-digital sampling rate (FADC) is independently selectable, it is often selected as or locked into being a subharmonic of the demodulation frequency (referred to herein interchangeably as "fsense" or "FSENSE"). Demodulation alone could shift a 43.755 kHz signal down by approximately 22 kHz if FSENSE is selected to one half of the highest frequency of 43.755 kHz. However, this would still require an analog-to-digital sampling rate (referred to herein as "FADC") of about 44 kHz, which would be above the capability of the analog-to-digital convertor 450 in this example and which would also require selecting FADC to be above FSENSE rather than as a sub-harmonic of FSENSE.

However, by applying some constraints and taking advantage of the natural aliasing performed by an analog-to-digital convertor, FSENSE and FADC can be selected so that all four of the frequencies in this example can be downconverted such that they satisfy the Nyquist Theorem, and additionally so that the downconverted versions of the four frequencies will be relatively equally space apart from each other below Nyquist frequency. This latter characteristic of relatively equal spacing below Nyquist frequency helps to improve the performance of and reduce the complexity of signal detection filters 460, by limiting the frequency range required and by preventing overlap/close spacing which would require extremely precise filtering to discriminate between the frequencies.

Applying the following constraints allows for selecting, and then presetting within processing system 110A, a combination of FSENSE and FADC which will suitably downconvert and relatively equally space the downconverted frequencies during active pen signal detection operations of processing system 110A.

1. FADC=FSENSE/N, wherein N is an integer.
2. Resulting downconverted active pen signal frequencies should be equally or relatively equally spaced.
3. Resulting downconverted active pen signal frequencies should be shifted away from 0 and Nyquist frequencies.
4. Alias folding is allowed, but should be minimized since it results in excessive sensitivity to frequency drift. Alias Folding ("AF") is calculated as: AF=(FX−FSENSE)/(FADC/2), where FX is a value of a particular active pen signal frequency (e.g., F1, F2, F3, or F4).

Since FSENSE is a discreet value typically set by dividing a system clock value by an integer N and there are a variety of other constraints, brute force method can be used to solve for acceptable settings for FSENSE and FADC. As one example of how these calculations may be performed, a sample MATLAB script for performing the calculation of FSENSE and FADC is presented in Table 1.

TABLE 1

Example MATLAB Script for Finding Frequencies
for Use in Active Pen Sensing

```
fsignal = [21.877 25.004 40.613 43.755] ; % signal frequencies
fsense = [ 12:0.1:120 ] ; % search range and step
fadc = fsense fsense ./ [1:4 ]; % possible ADC frequencies
fadc = unique(fadc) ; % remove duplicates
fadc(fadc < 10 | fadc > 23) = ''; % enforce FADC range
fbeat = 0 ; % beat tone − down converted and aliased signal
% fset will collect all valid combination of FBEAT, FSENSE and FADC
fset = zeros(length(fsense)*length(fadc)+2,length(fsignal) + 1 + 1) ;
fset_indx = 1 ;
for k = 1:length(fadc)
    for j = 1:length(fsense)
        for i = 1:length(fsignal)
```

TABLE 1-continued

Example MATLAB Script for Finding Frequencies
for Use in Active Pen Sensing

```
            if round(fsense(j)/fadc(k)) == fsense(j)/fadc(k) % ensure
FSENSE is multiple of FADC
                fbeat = mod(fsignal(i) − fsense(j), fadc(k)) ; % down
convert and alias using modulo function
                if fbeat > fadc(k)/2
                    fbeat = fadc(k) − fbeat ; % beat tone is above
                    Nyquist - reverse alias
                end
                fset(fset_indx,i) = fbeat ; % save FBEAT for all signal
                frequencies
            end
        end
        fset(fset_indx,end−1:end) = [ fsense(j) fadc(k) ] ; % append
        FSENSE and FADC
        fset_indx = fset_indx + 1 ;
    end
end
% now evaluate "fset", apply constrains, sort by minimum spacing, etc
        end
        fset(fset_indx,end−1:end) = [ fsense(j) fadc(k) ] ;
        fset_indx = fset_indx + 1 ;
    end
end
%% evaluate "fset", apply constrains, sort by minimum spacing
```

In this example the results of calculations indicate that FSENSE can be set to 17 kHz, while the Nyquist frequency is one half of this frequency at 8.5 kHz, and FADC is set at the Nyquist rate (e.g., 17 kHz) which is twice the Nyquist frequency of 8.5 kHz. These setting result in the downconverted frequencies, shown in Table 2, where a prime represents a result after demodulation and a double prime represents a result after demodulation and aliasing (which has no effect on signals that are already below the Nyquist frequency).

TABLE 2

Frequencies at Receipt, After Demodulation,
and After Demodulation + Aliasing

|  | F1(kHz) | F2(kHz) | F3(kHz) | F4(kHz) |
|---|---|---|---|---|
| Input Signal | 21.877 | 25.004 | 40.613 | 43.755 |
| Demodulated (') | 4.877 | 8.004 | 23.613 | 26.755 |
| Demodulated & Aliased ('') | 4.877 | 8.004 | 6.613 | 7.245 |

In the double prime results listed in Table 2, F1 and F2 are downconverted by FSENSE and sampled by analog-to-digital convertor 450 directly, F3 is downconverted to 23.613 kHz and then aliased twice; while f4 is downconverted to 26.755 kHz and then aliased 3 times (which includes two subtractions of the Nyquist frequency and one folding about the Nyquist frequency). Table 2 is illustrated graphically in FIGS. 5-7.

Figure 5:
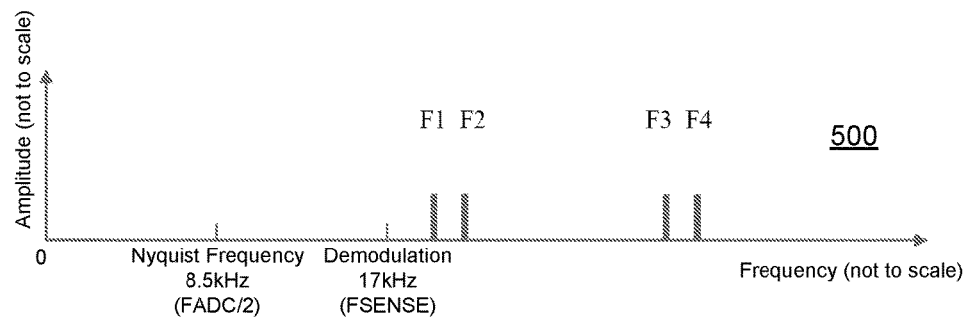
FIG. 5 depicts a graph of the four frequencies of an active pen signal, according to various embodiments.

FIG. 5 depicts a graph 500 of the four frequencies (F1, F2, F3, and F4) of an active pen signal, according to various embodiments.

Figure 6:
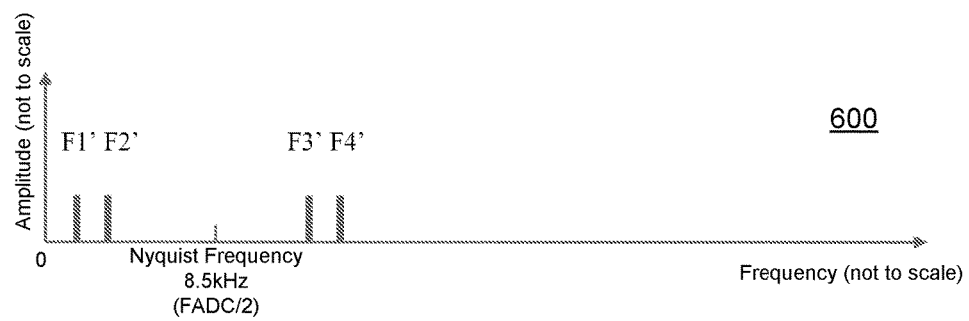
FIG. 6 depicts a graph of the resulting frequencies of the four frequencies of the active pen signal after demodulation, according to various embodiments.

FIG. 6 depicts a graph 600 of the four resulting frequencies (F1', F2', F3', and F4') of the active pen signal of FIG. 5 after demodulation, according to various embodiments.

Figure 7:
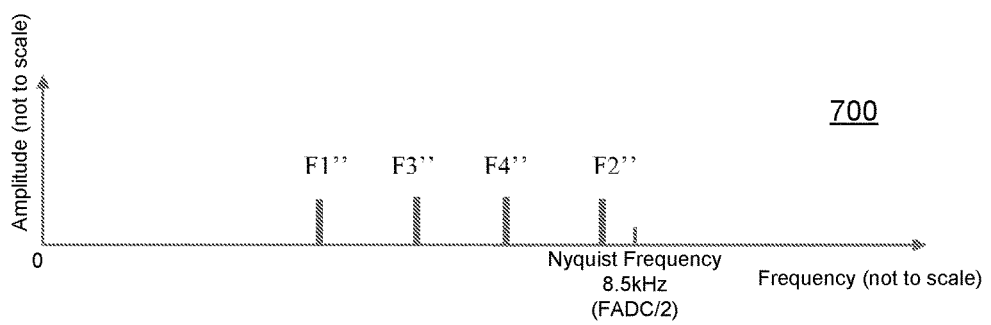
FIG. 7 depicts a graph of the resulting frequencies of four frequencies of the active pen signals after demodulation and analog-to-digital conversion which aliases some of the demodulated signal, according to various embodiments.

FIG. 7 depicts a graph 700 of the four resulting frequencies (F1'', F2'', F3'', and F4'') of the active pen signal of FIG. 5 after demodulation and analog-to-digital conversion which aliases some of the demodulated signals, according to various embodiments.

Example Methods of Operation

FIG. 8 illustrates a flow diagram 800 of a method of active pen signal detection, according to various embodiments. Procedures of this method will be described with reference to elements and/or components of one or more of FIGS. 1-7. It is appreciated that in some embodiments, the procedures may be performed in a different order than described, that some of the described procedures may not be performed, and/or that one or more additional procedures to those described may be performed.

With reference to FIG. 8, at procedure 810 of flow diagram 800, in one embodiment, a signal (e.g., active pen signal 411) is received from an active pen that is configured for use with a capacitive sensing input device. The active pen signal is ultimately received at and processed by a processing system (e.g., processing system 110A) that includes an analog-to-digital convertor (e.g., ADC 450). The processing system (e.g. processing system 110A) may also include one or both of a demodulator (e.g., demodulator 420) and an anti-aliasing filter (e.g., anti-aliasing filter 440). In various embodiments, the sampling rate of the analog-to-digital convertor is lower than one or more, and possibly all, of the plurality of possible transmission frequencies of the active pen signals. In some embodiments the sampling rate of the analog-to-digital convertor is lower than the Nyquist rate sampling rate associated with at least one, and possibly all, of the plurality of possible transmission frequencies of the active pen signals.

With continued reference to FIG. 8, at procedure 820 of flow diagram 800, in one embodiment, at least one of downconverting and aliasing is performed to achieve a resulting signal from the received active pen signal. It should be appreciated that the active pen signal may be integrated by a charge integrator prior to being downconverted and/or aliased. In an embodiment where downconverting is performed, a demodulator (e.g., demodulator 420) of the processing system is used to demodulate and thus downconvert the signal into a demodulated signal. In an embodiment where aliasing is performed, an analog-to-digital convertor (e.g., analog-to-digital convertor 450) of the processing system is used to alias a signal (which in some embodiments may have already been demodulated) into an aliased signal. Depending upon the starting frequencies and the requirements of the resulting frequencies, one of the following will take place based on prior selection and setting in the processing system of the demodulation (FSENSE) frequency and sampling (FADC) frequency for use in active pen signal detection for a particular active pen: 1) demodulation only; 2) aliasing only; 3) demodulation followed by aliasing. In embodiments with multiple different active pen frequencies, a mixture of these techniques may be utilized depending on the frequency of the active pen signal being processed. For example, in the embodiment illustrated in FIGS. 5-7, F1 and F2 are only demodulated, while F3 and F4 are both demodulated and aliased.

When aliasing is performed following demodulation, the aliasing and an analog-to-digital conversion are simultaneously performed by processing the demodulated signal through the analog-to-digital convertor (e.g., analog-to-digital convertor 450). An aliasing ratio (i.e., the number of times the demodulated signal is aliased) performed by processing the demodulated signal through the analog-to-digital convertor varies based on a relationship of the frequency of the demodulated signal to a sampling rate of the analog-to-digital convertor.

For example, when a signal being sampled by analog-to-digital convertor 450 is below the Nyquist frequency of analog-to digital convertor 450 it will be received by and passed through by analog-to-digital convertor 450 without being aliased; when a signal being sampled by analog-to-digital convertor 450 is more than one times the Nyquist frequency but less than two times the Nyquist frequency, it will be aliased one time; when a signal being sampled by analog-to-digital convertor 450 is more than two times the Nyquist frequency but less than three times the Nyquist frequency, it will be aliased two times; when a signal being sampled by analog-to-digital convertor 450 is more than three times the Nyquist frequency but less than four times the Nyquist frequency, it will be aliased three times; etc. It should be understood that aliasing involves both frequency subtraction and frequency folding about the Nyquist frequency. As a general rule, an odd number of aliasings will involve frequency folding and will also involve frequency subtraction when the odd number is greater than 1, while an even number of aliasings will only result in multiple instances of frequency subtraction.

When aliasing is performed on a signal that has not received prior demodulation, the aliasing and an analog-to-digital conversion are performed by processing the signal through the analog-to-digital convertor (e.g., analog-to-digital convertor 450). It should be appreciated analog-to-digital convertor 450 may perform aliasing and analog-to-digital conversion simultaneously. An aliasing ratio (i.e., the number of times the signal is aliased) performed by processing the signal through the analog-to-digital convertor varies based on a relationship of the frequency of the signal to a sampling rate of the analog-to-digital convertor.

For example, when a signal being sampled by analog-to-digital convertor 450 is below the Nyquist frequency of analog-to digital convertor 450 it will be received by and passed through by analog-to-digital convertor 450 without being aliased; when a signal being sampled by analog-to-digital convertor 450 is more than one times the Nyquist frequency but less than two times the Nyquist frequency, it will be aliased one time; when a signal being sampled by analog-to-digital convertor 450 is more than two times the Nyquist frequency but less than three times the Nyquist frequency, it will be aliased two times; when a signal being sampled by analog-to-digital convertor 450 is more than three times the Nyquist frequency but less than four times the Nyquist frequency, it will be aliased three times; etc. It should be understood that aliasing involves both frequency subtraction and frequency folding about the Nyquist frequency. As a general rule, an odd number of aliasings will involve frequency folding and will also involve frequency subtraction when the odd number is greater than 1, while an even number of aliasings will only result in multiple instances of frequency subtraction.

With continued reference to FIG. 8, at procedure 830 of flow diagram 800, in one embodiment, one of a plurality of possible resulting signal frequencies present in the resulting signal is detected. In various embodiments one or more signal detection filters 460 are employed to detect which, if any frequency is present. With reference to Table 2, for example, one filter can be employed to detect F1", a second filter can be employed to detect F2", a third filter can be employed to detect F3", and a fourth filter can be used to detect F4". The detected resulting signal frequency (e.g., detected active pen signal 470) is associated with a particular one of a plurality of possible transmission frequencies of the active pen signal (e.g. active pen signal 411), and each of the plurality of transmission frequencies of the active pen signal represents information about operation of the active pen (e.g., active pen 141). For example, detection of a signal at frequency F1" correlates to an active pen signal at frequency F1. In other embodiments more than one, up to all of the possible frequencies, may be detected when the active pen (e.g., active pen 141) transmits on more than one frequency at a time. In some embodiments, the detected resulting signals, when there are more than one, are spaced apart below the Nyquist frequency and do not overlap one another or crowd near either or crowd near 0 hz or near the Nyquist frequency. In some embodiments, when there are three or more detected resulting signals, they are also equally or relatively equally (i.e., within several hundred Hertz of equal on-center spacing) spaced apart from one another. Spacing apart from 0 hz and from the Nyquist frequency ease downconversion, and spacing apart from one another makes discrimination between adjacent frequencies easier to accomplish.

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. The description as set forth is not intended to be exhaustive or to limit the embodiments to the precise form disclosed.

Reference throughout this document to "one embodiment," "certain embodiments," "an embodiment," "various embodiments," "some embodiments," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation.

What is claimed is:

1. A method of active pen signal detection, said method comprising:
    receiving, at a processing system comprising an analog-to-digital convertor (ADC) and a deactivated anti-aliasing filter, a signal from an active pen, wherein said active pen is configured for use with a capacitive sensing input device;
    passing the signal through the deactivated anti-aliasing filter;
    performing, by the ADC, aliasing to achieve a resulting signal,
    wherein the aliasing and an analog-to-digital conversion are simultaneously performed by processing the signal through said ADC, wherein an aliasing ratio performed by processing said signal through said ADC varies based on a relationship of a frequency of said signal to a sampling rate of said ADC; and
    detecting, by said processing system, one of a plurality of possible resulting signal frequencies present in said resulting signal, wherein said detected resulting signal frequency is associated with a particular one of a plurality of possible transmission frequencies of said signal, and wherein each of said plurality of possible transmission frequencies of said signal represents information about operation of said active pen.

2. The method as recited in claim 1, wherein said receiving a signal from an active pen comprises:
    receiving said signal at said processing system, wherein a sampling rate of said ADC is lower than at least one of said plurality of possible transmission frequencies.

3. The method as recited in claim 1, wherein said receiving a signal from an active pen comprises:
    receiving said signal at said processing system, wherein a sampling rate of said ADC is lower than the Nyquist rate associated with at least one of said plurality of possible transmission frequencies.

4. The method as recited in claim 1, further comprising:
    downconverting the signal by demodulating said signal to achieve a demodulated signal.

5. A processing system for a capacitive sensing input device and an active pen, said processing system comprising:
    a charge integrator;
    a demodulator;
    a deactivated anti-aliasing filter;
    an analog-to-digital convertor (ADC); and
    at least one signal detection filter, wherein said processing system is configured to:
        receive, with said charge integrator, a signal from said active pen to achieve an integrated signal;
        pass, without performing any anti-aliasing, the integrated signal through the deactivated anti-aliasing filter;
        perform aliasing with said ADC to achieve a resulting signal from said integrated signal,
        wherein the aliasing and an analog-to-digital conversion are simultaneously performed by processing the integrated signal through said ADC, wherein an aliasing ratio performed by processing said integrated signal through said ADC varies based on a relationship of a frequency of said integrated signal to a sampling rate of said ADC; and
        detect, using said at least one signal detection filter, one of a plurality of possible resulting signal frequencies present in said resulting signal, wherein said detected resulting signal frequency is associated with a particular one of a plurality of possible transmission frequencies of said signal, and wherein each of said plurality of possible transmission frequencies of said signal represents information about operation of said active pen.

6. The processing system of claim 5, wherein said demodulator is configured to selectively demodulate said integrated signal to achieve a demodulated signal that is downconverted from its original frequency to a lower frequency, wherein an output of said demodulator associated with said signal from said active pen comprises one of said integrated signal and said demodulated signal.

7. The processing system of claim 5, wherein a sampling rate of said ADC is lower than at least one of said plurality of possible transmission frequencies.

8. The processing system of claim 5, wherein a sampling rate of said ADC is lower than the Nyquist rate associated with at least one of said plurality of possible transmission frequencies.

9. The processing system of claim 5, wherein said plurality of resulting signals are spaced substantially evenly apart from one another.

10. A capacitive sensing input device,
    comprising: a capacitive sensor;
    an active pen configured for outputting a signal at a first frequency in response to a user interaction with said active pen; and a processing system comprising a deactivated anti-aliasing filter and an analog-to-digital convertor (ADC) configured to:
  receive the signal from said active pen;
  pass the signal through the deactivated anti-aliasing filter;
perform, by the ADC, aliasing to achieve a resulting signal from said signal,
  wherein the aliasing and an analog-to-digital conversion are simultaneously performed by processing the signal through said ADC, wherein an aliasing ratio performed by processing said signal through said ADC varies based on a relationship of a frequency of said integrated signal to a sampling rate of said ADC; and
detect one of a plurality of possible resulting signal frequencies present in said resulting signal, wherein said detected resulting signal frequency is associated with a particular one of a plurality of possible transmission frequencies of said signal, and wherein each of said plurality of transmission frequencies of said signal represents information about operation of said active pen.

11. The capacitive sensing input device of claim 10, wherein a sampling rate of said ADC is lower than at least one of said plurality of possible transmission frequencies.

12. The capacitive sensing input device of claim 10, wherein a sampling rate of said ADC is lower than the Nyquist rate associated with at least one of said plurality of possible transmission frequencies.

13. The capacitive sensing input device of claim 10, wherein said processing system is further configured to:
  perform a downconverting by demodulating said signal to achieve a demodulated signal.

14. The capacitive sensing input device of claim 10, wherein said plurality of resulting signals are spaced substantially evenly apart from one another.

* * * * *